March 31, 1970  P. SMITH  3,504,257
CONTROL SYSTEMS FOR ELECTRIC MOTORS
Filed Nov. 27, 1967  2 Sheets-Sheet 1

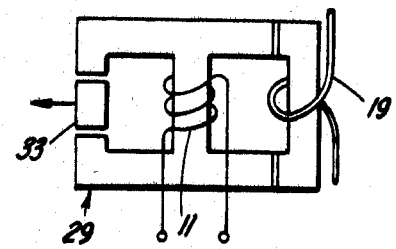
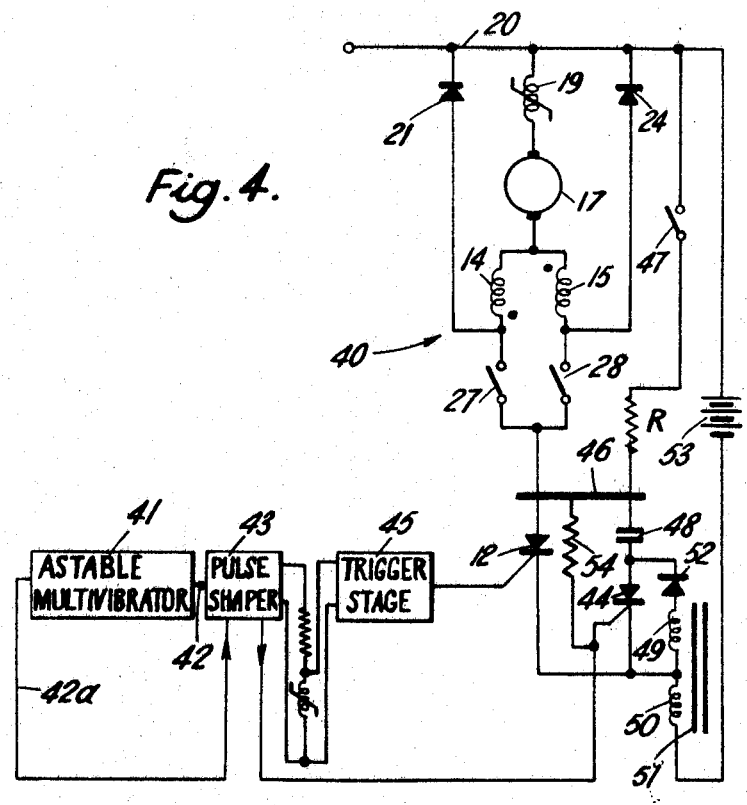

United States Patent Office 3,504,257
Patented Mar. 31, 1970

3,504,257
CONTROL SYSTEMS FOR ELECTRIC MOTORS
Patrick Smith, Basingstoke, England, assignor to Lansing Bagnall Limited, Basingstoke, England, a British company
Filed Nov. 27, 1967, Ser. No. 685,793
Claims priority, application Great Britain, Nov. 28, 1966, 53,133/66
Int. Cl. H20p 3/10
U.S. Cl. 318—252
10 Claims

ABSTRACT OF THE DISCLOSURE

A pulse controlled electric motor has two series field windings wound in opposite senses on the main poles. Current flow (during normal energisation of the motor), through one of the windings is prevented by a diode, the direction of rotation of the motor's armature being selected by a switch in series between the respective winding and a thyristor which is triggered at intervals to provide current flow through the motor. When the motor is reversed, current flow through both windings occurs and the resultant field flux is low. The armature-induced electromotive force is reduced and the consequent braking effort is not violent. An alternative circuit, in which the armature terminals are interchanged when braking is required, is also disclosed.

---

The present invention relates to control systems for electric motors and particularly to control systems having means for feeding control pulses to a control or trigger circuit (which may include a thyristor) which on receipt of a control pulse permits current to flow to energise the motor. One such system, to which the present invention is particularly applicable, is that in which a series motor is arranged in series with a thyristor to the gate of which is fed a controlled proportion of the control pulses, the conduction of the thyristor produced by a control pulse causing current to flow in the motor circuit. For convenience, the present invention will be particularly described with reference to that system.

The present invention is particularly directed to improving the operation of such motors when they are "plugged" (that is, their torque is reversed by reversing the current flow through either the armature or the field windings). When an electric motor is "plugged," the armature induced electromotive force augments the supply voltage applied to the armature. The reverse torque is very high and the motor comes rapidly to a halt. This is often undesirably fast, especially when the motor is used to drive a vehicle. Also, the very high armature current may damage parts of the control circuit. It is therefore desirable to be able to reduce this current and achieve a slower, but more controlled braking effort.

According to the invention, a control system for a direct current electric motor comprises means for feeding control pulses to a control or trigger circuit which on receipt of a control pulse permits current to flow to energise the motor, a field circuit including two field windings arranged when energised to provide magnetic fields in opposite senses, and means for preventing current flow in one of the field windings during normal energisation of the motor but permitting current flow in both windings when the motor is "plugged."

With the present invention, the other of the two windings will provide flux for the motor during normal operation. When the motor is "plugged," the resultant field will be small, its actual value depending on the speed of the motor. The electromotive force induced by the movement of the armature will be reduced by virtue of the small resultant field strength. Accordingly, the braking effort is smaller and the dangers of excessive motor current are reduced.

In the following, reference will be made to the accompanying drawings, in which:

FIGURE 3 is a diagrammatic representation of a transductor adapted for use in the embodiments shown in FIGURES 1 and 2; and FIGURE 4 is a further diagram illustrating a practical form of the embodiment shown in FIGURE 2.

The present invention will, for convenience, be described with reference to a control system including a control circuit to which control pulses are fed from a pulse generator and in which a transductor has a winding energised by armature current and another winding controlling the proportion of pulses actually fed to the control circuit in accordance with the saturation of the transductor's core produced by the armature current. The controlling winding may be arranged in a potential divider network arranged across the output of one stage of the pulse generator, the input to the next stage being taken across the transductor. Such control pulses as are permitted to pass by the transductor may be applied to trigger a thyristor in series with an appropriate supply and a series motor; the thyristor is usually associated with a conventional "commutating" capacitor arranged to cut off the thyristor at the end of a control pulse. The important details of this type of system will be described later in this specification. It will be understood however that the present invention is not limited to use with such a system.

Figure 1:
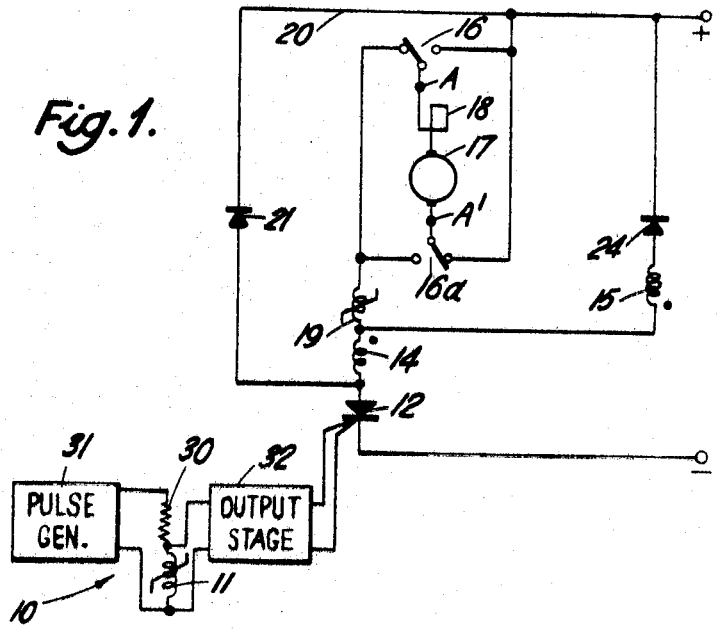
FIGURE 1 is a diagram illustrating one embodiment of the invention in simplified form.

In FIGURE 1 the pulse generator and an associated control network are shown diagrammatically at 10, the output of the generator being controlled by a winding 11 on a transductor arranged as shown in FIGURE 3 (to be described later). When a control pulse fires the thyristor 12, current is permitted to flow from a positive supply line 20 through an optional compole winding 18, the armature of the motor 17, a main transductor load current winding 19 and a main field winding 14. Included in a circuit comprising the armature, the transductor winding 19 and the main field winding 14 is a conventional "free-wheeling" diode 21 which ensures current flow through the armature and field winding in the inter-pulse periods when the thyristor 12 is non-conducting.

During normal operation the pulses applied to the thyristor 12 drive the motor, the armature current through the load current winding 19 tending to produce saturation in the transductor core 29 (FIGURE 3), on one (separated) limb of which the winding 19 is wound. The flux produced by the current flowing in the winding 19 tends to saturate the core 29. The impedance of the winding 11, wound on the middle limb of the core 29, is high when the core is unsaturated but low when the core is saturated. The winding 11 forms part of a potential divider network 30 arranged across the primary stage 31 of the pulse generator, the input of an output stage 32 being coupled across the winding 11. Accordingly, as armature current flows and the core 29 is saturated, the application of pulses to the thyristor 12 is prevented. By increasing the reluctance of the magnetic circuit by withdrawing the movable element 33, which may be operated by a control pedal so that, for example, when acceleration is required, the reluctance of the magnetic circuit in the transductor core is increased so that the core requires a greater current through the load current winding for saturation. Under these circumstances more pulses are allowed to fire the thyristor and the motor tends to run faster. However, a controlled acceleration is achieved because an increase in armature current will still tend to saturate the transductor core.

In the system shown in FIGURE 1, the contacts 16 and 16a provide current flow in the appropriate direction in the armature. By reversing the current flow through the armature (by interchanging the connections at terminals A and A') the motor is "plugged" to provide braking action.

To the junction between the main field winding 14 and the transductor load current winding 19 is coupled one end of an auxiliary field winding 15 the other end of which is coupled through a diode 24 to the positive supply line 20. During normal operation it will be seen that the diode 24 is back-biased, thus preventing any current flow through the auxiliary field winding which has in such circumstances no effect on the circuit. The auxiliary field winding 15 is wound on the main poles of the motor and is arranged to provide, when energized, a field in opposition to the field caused by energizing the main field winding 14 on the poles.

When it is desired to brake the motor, the motor is reversed, or "plugged" by reversing the flow of current through the armature. This can be done by changing the polarity of both switches 16 and 16a. When the armature current is reversed while the motor is rotating and when the motor field is being established by the firing of a pulse to the thyristor 12, the direction of the armature-induced electromotive force is reversed so that current will start to flow in the circuit consisting of the armature, the transducer load current winding 19, the auxiliary field winding 15, its associated diode 24 and the compole winding. Since the auxiliary field winding is in opposition to that of the main field winding the effect of the excitation is to reduce the total excitation provided by the main poles. This accordingly reduces the armature-induced electro-motive force (since this is proportional to the flux in the main poles) and accordingly the braking current and the braking effort is reduced. As has been described, the influence of the transductor determines the frequency of the firing of further "on" pulses to the thyristor 12; the arrangement of the main and auxiliary field windings according to the present invention controls the magnitude of the braking current for the duration of each pulse. By adjusting the relative turns ratio of the main and auxiliary field windings it is possible to vary the characteristics of the braking current and hence the rate of deceleration when the motor is reversed.

Figure 2:
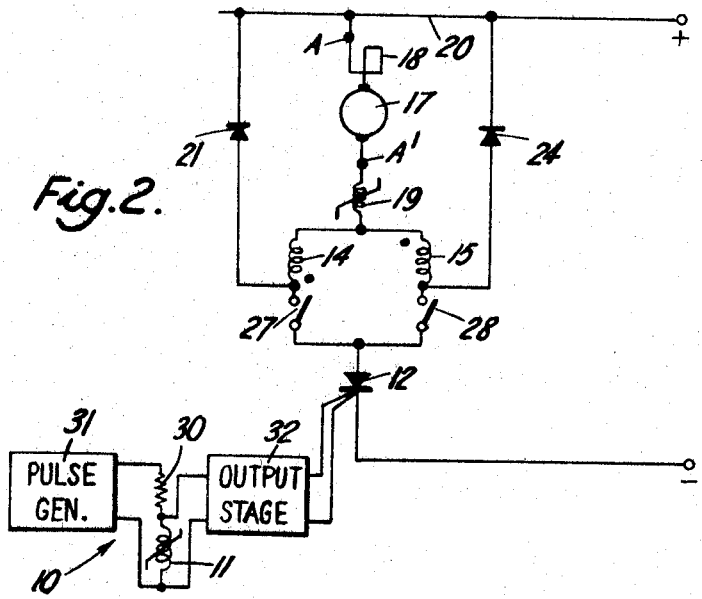
FIGURE 2 is a diagram illustrating another embodiment of the invention in simplified form.

The system shown in FIGURE 2 is in many ways similar to that shown in FIGURE 1. The network 10 may be the same and the transducer of FIGURE 3 may also be arranged as before. Accordingly, the winding is arranged in series with the armature 17, the compole winding 18, and the control circuit, constituting as before the thyristor 12.

To the end of the transductor's secondary winding 19 remote from the armature 17 is conjoined one end of each of the two field windings which as before are arranged when energised to produce opposing fields, the windings being similar and wound on the main poles in opposite senses. Both windings are capable of driving the motor, the direction of rotation of the armature being selected by closing one of the two switches 27 and 28, the other remaining open.

Assuming switch 28 is open, then current will not flow through the winding 15 during normal energisation of the motor, owing to the diode 24. To reverse the motor, first both switches 27 and 28 are opened; then switch 28 (in the example given) is now closed. This establishes a field of opposite polarity to that previously produced. The triggering of the circuit by the next "on" pulse to the thyristor 12 will reverse the direction of the armature-induced electromotive force. Current will now flow also in the circuit consisting of the motor armature, the transductor load current winding 19, the motor's field winding 14, diode 21 and the compole winding 18. Since the polarities of the magnetic fields due to the currents flowing in the windings 14 and 15 are in opposition the resultant motor field excitation is reduced, causing a reduction in the armature-induced electromotive force and a consequent reduction in the braking effort.

In FIGURE 4 is shown the system of FIGURE 3 in a practical form, of which the principal features will be described. The configuration of the system as far as conventional features such as safety arrangements and the like will not be described.

The motor circuit 40 in FIGURE 4 follows the lines of that already described with reference to FIGURE 2. In FIGURE 4 there is shown an astable multivibrator 41 whose two complementary outputs 42, 42a alternately feed pulses (through a pulse shaper stage 43) to, respectively, the potential divider network 30, arranged as previously described, and the "gate" input of a second thyristor 44. A trigger stage 45 is fed from the winding 11, the output pulses from the trigger stage being applied to the "gate" input of the thyristor 12. The anode of the thyristor 12 is connected to a heat sink 46, which is connected through various switching arrangements (shown as switch 47 and resistor R) to the battery supply line 20. The heat sink 46 is connected through a commutating capacitor 48 to the anode of the thyristor 44 whose cathode together with the cathode of the thyristor 12 is coupled to the junction between a secondary winding 49 and a primary winding 50 on a transformer core 51. The other end of the secondary winding 49 is connected via a diode 52 to the anode of the thyristor 44 and the other end of the primary winding is coupled to the negative terminal of a battery 53 whose positive terminal feeds the supply line 20. A resistor 54 couples the anode of thyristor 12 with the gate of thyristor 44.

In operation, the closure of switch 47 initially raises the heat sink 46 to battery potential and a trigger pulse is applied via resistor 54 to thyristor 44 which then conducts and charges capacitor 48 to battery potential.

The closure of switch 47 also results in the closure of contactor 27 and the first "on" pulse to thyristor 12 renders it conductive permitting current flow through the motor circuit 40 and lowering the heat sink potential to a few volts positive. At the same time the charge on capacitor 48 reverses via thyristor 12, secondary winding 49 and diode 52, and instantaneously drives the cathode of thyristor 44 positive thus turning it off. The reversed charge on capacitor 48 is trapped by diode 52.

The "on" pulse is terminated when a trigger signal is applied to the gate of thyristor 44, resulting in capacitor 48 discharging through thyristor 44 and driving the cathode of thyristor 12 positive, thus turning it off.

As is well known, the transformer arrangement both limits the peak current through the diode 52 and increases the final voltage on the capacitor 48.

It will be appreciated that other control or trigger circuits than those comprising thyristors could be used if desired.

I claim:
1. A control system for a direct current electric motor having an armature circuit and a field circuit, comprising a power source, a controllable power switch disposed between said power source and the motor, means for feeding control pulses to said controllable power switch whereby said motor is energised during predetermined energisation periods, said field circuit including first and second field windings arranged when energised to provide magnetic fields in opposite senses, dynamic braking means operative during a selectable dynamic braking period to reverse said motor while the armature thereof is rotating, and current flow control means for preventing current flow from said power source in said first winding during said energisation periods but permitting current flow in both said first and second windings during said dynamic braking period, said current flow in both said first and second windings producing substractive magnetic fields through said armature circuit.

2. A control system as claimed in claim 1 wherein the motor is a series motor.

3. A control system as claimed in claim 2 in which there is provided for each of the field windings a switch which when closed allows current to flow from said power source in the winding and a unidirectionally conductive means in series with the respective winding which prevents current flow from said power source through the winding when the switch is open.

4. A control system as claimed in claim 3 in which the two windings, at one end thereof, are coupled together and to the armature circuit of the motor, the switches being provided in series with the respective winding but on the side thereof remote from the said armature circuit.

5. A control system as claimed in claim 2 in which means are provided to reverse the direction of current flow through the armature circuit.

6. A control system as claimed in claim 5, in which the first winding is provided across the armature circuit of the motor, and is in series with a unidirectionally conductive element.

7. In a pulse-controlled electric motor circuit, said motor having an armature circuit with first and second terminals and main field poles, the combination comprising:
first and second series field windings wound in opposite senses on said poles said windings each having first and second ends and being at the first ends thereof coupled together and to said first terminal;
a first unidirectionally conductive element coupled between said second end of said first winding and said second terminal;
a second unidirectionally conductive element coupled between said second end of said second winding and said second terminal;
controlled rectifier means having anode, cathode and a control terminal, said anode thereof being coupled to said second ends of said first and second windings;
first and second switch means each having open and closed positions, respectively coupled between the second end of a respective winding and the anode of the controlled rectifier means;
battery means coupled between said cathode and said second terminal of said armature circuit; and
pulse generator means having an output coupled to said control terminal, said unidirectionally conductive elements permitting current flow in the sense opposite that provided by the controlled rectifier means when the last-named means is rendered conductive by a pulse from said pulse generator means.

8. In a pulse controlled electric motor circuit, said motor having an armature with first and second terminals and main field poles, the combination comprising:
first and second series field windings, wound in opposite senses on said poles, said windings each having first and second ends, said first ends of the said windings being coupled to the said first terminal;
first and second unidirectionally conductive means coupled between the second end of a respective one of said windings and said second terminal;
controlled rectifier means having anode, cathode and control electrode, said anode being coupled to said second end of said second winding;
pulse generator means having an output coupled to said control electrode;
battery means coupled between said cathode and said second terminal, said unidirectionally conductive means permitting current flow in the sense opposite to that provided by the controlled rectifier means when said last named means is rendered conductive by a pulse from said pulse generator means; and
switch means for interchanging said first and second terminals.

9. A control system for a direct current electric series motor having an armature circuit and a series field circuit, comprising a power source, a controllable rectified means disposed as a power switch in series with said power source and said armature circuit, means for feeding control pulses to said controllable rectifier means whereby said motor is energised during predetermined energisation periods, said series field circuit comprising different first and second current loops, said first current loop including a first field winding, a first unidirectionally conductive means and said armature circuit, said second current loop including a second field winding, a second unidirectional conductive means and said armature circuit, dynamic braking means including means for causing armature current induced by movement of the armature of the motor to augment current flowing through said armature circuit from said power source during dynamic braking periods, and current flow control means including said first and second unidirectionally conductive means for preventing current flow in said first winding during said energisation periods and for permitting said armature current to flow in both said first and second windings during said braking periods, said first and second windings being disposed whereby the flow of armature current therein produces opposed magnetic fields through said armature circuit.

10. A control system as claimed in claim 9 wherein the dynamic braking means comprises reversing switch means.

References Cited

UNITED STATES PATENTS

| | | | |
|---|---|---|---|
| 2,507,918 | 5/1950 | Mageoch | 318—381 |
| 2,624,029 | 12/1952 | Lillquist | 318—381 |
| 2,745,050 | 5/1956 | Johnson et al. | 318—381 |
| 2,945,998 | 7/1960 | Vanderberg | 318—381 |
| 3,335,351 | 8/1967 | Morris | 318—373 |

ORIS L. RADER, Primary Examiner

K. L. CROSSON, Assistant Examiner

U.S. Cl. X.R.

318—258, 371, 381